(12) United States Patent
Homan

(10) Patent No.: US 7,798,516 B2
(45) Date of Patent: Sep. 21, 2010

(54) CHANGING TABLE

(76) Inventor: Holli L. Homan, 716 Gaskill Ave., Jeanette, PA (US) 15644

( * ) Notice: Subject to any disclaimer, the term of this patent is extended or adjusted under 35 U.S.C. 154(b) by 353 days.

(21) Appl. No.: 12/014,574

(22) Filed: Jan. 15, 2008

(65) Prior Publication Data
US 2009/0178203 A1      Jul. 16, 2009

(51) Int. Cl.
*B62B 1/00* (2006.01)
(52) U.S. Cl. .................. 280/650; 280/30; 280/642; 280/47.41
(58) Field of Classification Search ............ 280/30, 280/642, 650, 652, 648, 47.4, 47.38, 47.41
See application file for complete search history.

(56) References Cited

U.S. PATENT DOCUMENTS

| | | | | |
|---|---|---|---|---|
| 2,790,484 A | * | 4/1957 | Pollack | 280/47.4 |
| 2,814,334 A | * | 11/1957 | Lane | 297/125 |
| 4,946,180 A | * | 8/1990 | Baer | 280/47.38 |
| 5,234,224 A | * | 8/1993 | Kim | 280/30 |
| 5,375,869 A | * | 12/1994 | Hsiao | 280/648 |
| 5,547,205 A | * | 8/1996 | do Rosario Sousa de Cabedo | 280/30 |
| 6,264,216 B1 | * | 7/2001 | Wilson | 280/30 |
| 6,843,498 B2 | * | 1/2005 | Bretschger et al. | 280/642 |
| 7,229,083 B2 | * | 6/2007 | Arai et al. | 280/47.38 |
| 7,451,709 B2 | * | 11/2008 | Swartfager et al. | 280/30 |
| 7,618,055 B2 | * | 11/2009 | Chuah et al. | 280/642 |

* cited by examiner

*Primary Examiner*—Hau V Phan
(74) *Attorney, Agent, or Firm*—Michael L. Greenberg, Esq.; Greenberg & Lieberman, LLC

(57) ABSTRACT

A changing table that is secured to most types of conventional baby carriages. The changing table is deployed from a fixed position on the baby carriage to take into account the proper weight, size and space requirements necessary to change a small child. When the changing table is not in use, it may be retracted and ultimately stowed into the baby carriage in an unobtrusive position. In this manner, the changing table becomes a useful, mobile alternative to those people who typically must seek out a safe, clean and adequate surface to change their small children.

19 Claims, 5 Drawing Sheets

CHANGING TABLE

FIELD OF THE INVENTION

The present invention is an apparatus to assist in changing diapers while on the go. More particularly, the present invention relates to a changing table that is secured to most types of conventional baby carriages that allows a user to unfold an expandable changing table capable of handling the riggers and dynamics associated with diaper changing.

BACKGROUND OF THE INVENTION

"The more things change, the more they stay the same." As this proverb illustrates, although technology has allowed for advancements regarding numerous issues, many things remain unchanged.

For instance, in the past, when a man wanted to travel from Europe to North America, he would have to endure difficult and long months at sea. Now, technology even allows us to travel to the moon. On the other hand, when it comes to the maturation process of a baby, things remain very similar to past experiences. For example, while there have been periodic successes in "potty-training" programs, the majority of small children and babies continue to use diapers. So in essence, many babies still wear diapers for the initial and formative months of their lives. It is not unusual to see parents in the park looking for a proper place to change a baby's diaper.

As technology develops, a realization has emerged that although changing tables have become more available and evolved to a certain extent, there are still intrinsic limitations that hamper their usefulness. Current techniques utilized to make sure children are changed quickly and efficiently include adding changing tables to public bathrooms (and the changing tables and public bathrooms are often times not clean), changing a child at the park bench, changing a child in the back of a car, or even changing a child in a corner of a restaurant. Although all of these techniques work and ultimately the child is changed, all the aforementioned techniques are not ideal because they essentially force the parents and the child to engage in the changing process in a less-than-desirable environment. Who wants to see a baby being changed on a park bench? Who wants to see a baby being changed in the corner of a restaurant? Who, still, wants to see a baby changed in a bathroom that adults themselves feel are dirty? In short, desirable avenues for changing diapers are few and far between. Oftentimes, most options for changing diapers are inconvenient for the caretakers as well as for the people around them.

Thus, there is a need for an apparatus that allows changing a child's diaper relatively convenient, private, and at the same time fully safe. While parents could certainly carry a changing table with them during trips, no parent truly wants to lug a changing table around the zoo or around the mall. In fact, some portable changing tables amount to a cushioned mat that can be placed on the ground, a park bench, or even draped across car seats. Unfortunately, a cushioned mat is not a changing table—and it naturally follows that cushioned mats do not provide any security means for retaining a child in case the child decides to roll. Further, cushioned mats are a little more than fancy blankets; there is no rigid structural support that a cushioned mat provides should the changing surface nearby not be completely flat—for example, if the cushioned mat is placed on rocky ground. Therefore, a need exists for an apparatus that offers the stability, child retaining ability, familiarity, and storage nooks commonly found in a changing table; but that is portable.

Even a portable changing table is cumbersome to haul, as aforementioned, so there is a need for a novel apparatus that does not require carrying, as does a changing table. Cushioned changing mats still must be folded under the arm or placed in a backpack, taking up space and adding weight. Parents require a changing table that is ready for use whenever desired, but that does not need to be hauled around in a backpack, under the arm, or stored in a car truck inaccessibly when remote from the car.

U.S. Pat. No. 6,389,624 issued to Madole on May 21, 2002, is a portable child changing apparatus that serves as a changing table that can essentially be broken down into a mobile bag form. Unlike the present invention, Madole must still be carried, watched and transported as a separate item. Madole provides the use of a carrying strap to sling the item onto a baby carriage. This is significantly different from the present invention because the present invention becomes secured and therefore part of the baby carriage. This creates an easier apparatus to work with as the user of the present invention merely unlocks a clasp and gets to utilize an elevated changing table that is sturdy and compact. Moreover, a user of the present invention only has to watch out for the baby carriage and not a baby carriage and portable changing table as is the case with Madole.

U.S. Pat. No. 5,234,224 issued to Kim on Aug. 10, 1993 is a multi-function baby support and transport apparatus. Kim takes a baby seat with wheels and attaches a changing table to its handle. Unlike the present invention, Kim requires that the apparatus be broken down in order for the changing table to be a feasible endeavor. The present invention, in contrast, involves a secure and non-invasive changing table that, when deployed, does not interfere with any other aspect of the baby carriage.

In essence, current avenues for changing diapers while the baby and guardian are on the go are not wholly convenient. Moreover, parents and guardians are at the mercy of events outside of their control. This includes finding a bathroom with a diaper-changing station. Looking deeper into this scenario, the parent may find that when they do indeed find this diaper-changing station that it will be dirty, crowded or already in use.

A parent may opt to change a diaper in a vehicle. However, there are obvious issues relating to this scenario such as cramped conditions, lack of a level surface and cleanliness. Changing a child on the ground also contains obvious conditions that would not be desirable.

But for a parent and baby on the go, some sort of baby carriage—whether it is a large, fancy baby carriage or simple baby carriage without all the bells and whistles—is nearly always a constant accompanying device. Going to the park, taking a walk, traveling on vacation, enjoying an amusement park or shopping at the mall. Baby carriages are used to maneuver small children through throngs of people and other conditions. What the present invention does is to take this constant and combine it with an apparatus that specifically caters to the diaper-changing process on the parents' own terms rather than current reliance on somebody else. The result is a novel changing table that is not additionally cumbersome because it already is attached to the baby carriage.

Thus, this universal need is solved as parents can now use the present invention to change diapers under their own controlled conditions in an easily accessible and non-obtrusive way.

SUMMARY OF THE INVENTION

The present invention uses a modified version of a changing table. Although it works from the same principle as a conventional changing table, the present invention allows individuals changing the baby to horizontally expand a folded changing table, which is attached to the back of the seat of a conventional baby carriage, and lock the device to create one solid board for changing a child's diaper.

In the preferred embodiment of the present invention, a conventional baby carriage will have a changing table attached to its back via conventional means such as hinges. A clasp or other connection device locks the changing table into a closed position flush against the back of the baby carriage. When the clasp is twisted or otherwise relieved of its obstruction toward the changing table, the user may pull the top of the changing table away from the baby carriage so that the changing table deploys. In the preferred embodiment, the hinges contain pivots for a controlled and seamless deployment of the changing table.

Moreover, depending on the needs of the owner, an additional embodiment relates to a folded top half of the changing table. In this embodiment, the folded top half is folded inward via changing-table hinges and is flush against the back of a closed changing table. When the initial changing table is deployed, the folded top half may also be deployed as the user pulls the folded top half from underneath the deployed changing table. This aspect of the present invention basically involves a horizontal board that serves as the changing table. The second horizontal board, which is the folded top half, is stowed flush against the first horizontal board. Folded top half hinges or some other type of conventional rotating connection, link the two horizontal planes together. Depending on the placement of the folded top half (located at top of changing table or at bottom end of changing table), the user will initially deploy the changing table until it appears in its horizontal position. Then the user may, if desired, pull the folded top half until that element is in its horizontal position.

In essence, this embodiment serves to provide a longer changing table consistent with the needs of the diaper changing process. The ability to deploy the folded top half may be commenced via tightly-connected hinges that require a bit of physical force to open and close, or a clasp element similar to the one that keeps the changing table flush against the baby carriage.

An additional embodiment of the present invention features a horizontal changing table that is horizontally expanded from its folded position via expandable legs attached at the changing table corners. While a conventional baby carriage typically has a basket for storage behind and beneath the baby carriage seat, the present invention recognizes that the area immediately behind a conventional baby carriage seat is dead space—that is, above and behind the baby carriage seat, there is typically a conventional handle bar; while below and behind the baby carriage seat is typically a storage area.

Changing tables are typically not adjacent to the back of the seat of a conventional baby carriage because there are several adaptations to a changing table that make the present invention possible. First, modified legs may support the present invention when it is deployed as a changing table because an additional embodiment of the present invention envisions having one end that extends from a conventional baby carriage but requires support on the extended end. At the same time, the modified legs need to be fully adaptable to be "out of the way" when the present invention is in a stored position. Second, foldable sections may be used for the present invention because, unlike a conventional changing table, the foldable sections must be able to collapse upon one another for storage—as in when the present invention is in its retracted position. Third, the foldable sections of the present invention may have additional embodiment hinges that permit folding in one direction while not permitting complete rotation about the additional embodiment hinge, such that unfolded sections will remain end to end when a child is placed atop them. Fourth, the present invention has one end that is held against the back seat of the baby carriage by conventional means—so that the changing table of the present invention uses the weight of a baby carriage to which it is attached to prevent movement so long as the baby carriage's wheels are locked.

Once the changing table of the present invention is deployed horizontally from the back of the baby carriage, the legs of the additional embodiment of the present invention are expanded vertically from the changing table of the present invention so that the legs touch the ground. In this way, the legs of the present invention provide the necessary support for a child placed atop the changing table of the present invention. Of course, the legs of the present invention are sturdy enough to hold the changing table of the present invention up so that it does not fall. Moreover, the changing table of the present invention is arranged such that when it is unfolded above a conventional storage basket of a conventional baby carriage, the present invention still allows full access to the basket. This is important—as a conventional changing table typically has storage compartments for extra diapers, diaper powder, diaper cream, and all of the other diaper changing accoutrements. The present invention has a changing table arranged so as to provide the user who is changing a child the opportunity to deploy the changing table of the present invention first, and thereafter access and remove a clean diaper out from the conventional baby carriage basket.

An alternative embodiment of the present invention has at least one telescoping or sliding bar on at least one side of the changing table, the sides being defined as not the end of the changing table adjacent to the baby carriage or the end of the changing table opposite the baby carriage. Rather than legs deploying down from the changing table of the present invention, the present invention has the bars expanding from a point on the baby carriage near the baby carriage's wheels. The bars can elongate to maintain connection with the end of the changing table opposite the baby carriage. Moreover, for further support, the changing table rests on a bar also attached to the back of the seat, when in an expanded position.

BRIEF DESCRIPTION OF THE PREFERRED EMBODIMENT

DETAILED DESCRIPTION OF THE PREFERRED EMBODIMENT

Figure 1:
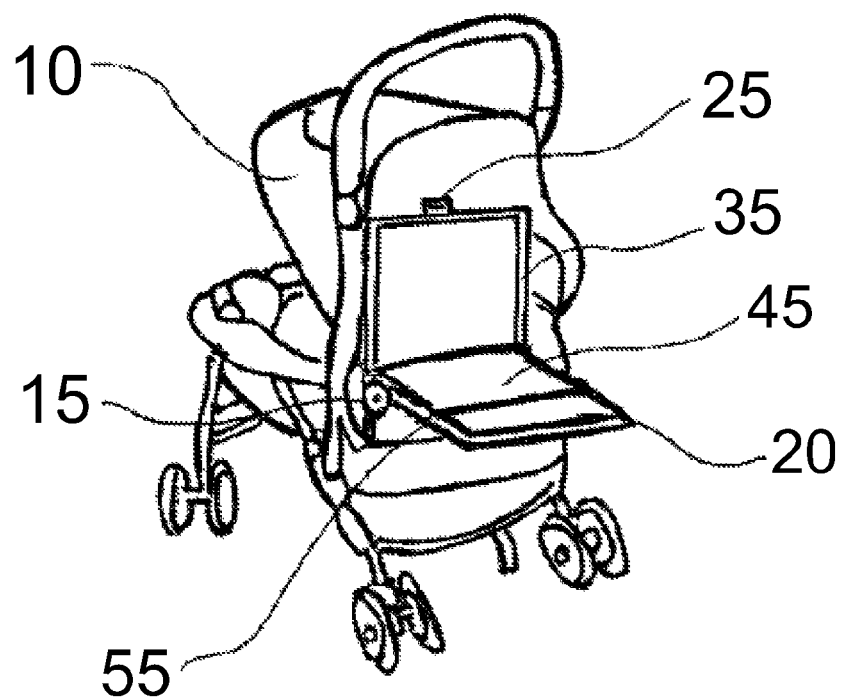
FIG. 1 is a view of the preferred embodiment of the present invention featuring a baby carriage with a partially deployed changing table.
Figure 3:
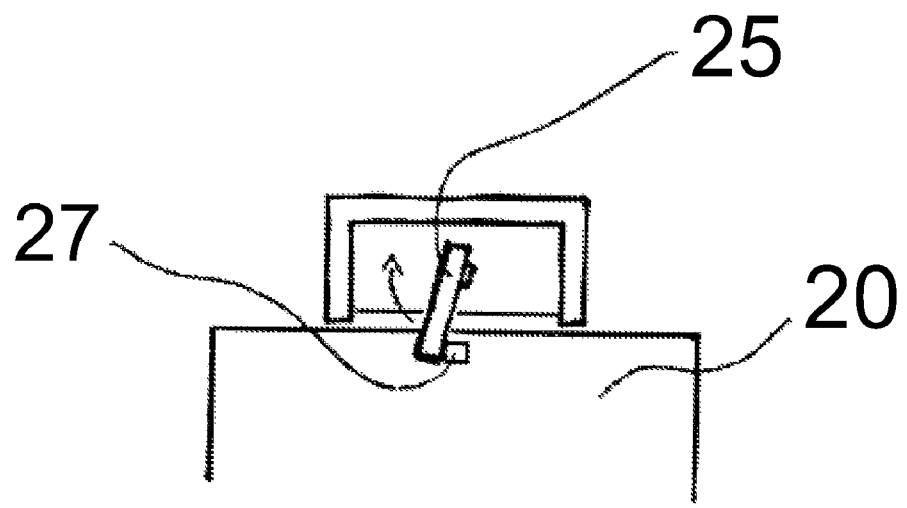
FIG. 3 is a view of a clasp of the present invention.

FIG. 1 demonstrates the preferred embodiment of the present invention as it offers a view of a baby carriage 10 with a deployed changing table 20. The preferred embodiment as we see in FIG. 1 reveals a conventional baby carriage 10 with a changing table 20 attached to its back via conventional means such as hinges 15. In FIG. 1, we see that the hinges 15 are secured to the back of the baby carriage 10 via conventional means and also secured to the changing table 20 via conventional means. When the clasp 25 as better seen in FIG. 3 is twisted or otherwise relieved of its obstruction toward the changing table 20, the user may pull the top of the changing table 20 away from the baby carriage 10 so that the changing table 20 deploys. In the preferred embodiment, the hinges 15 contain pivots for a controlled and seamless deployment of the changing table.

The changing table 20 itself is made of a relatively lightweight material such as hard plastic. The weight of the changing table 20 should be comparative with the dynamics and features of the baby carriage 10 in order to maintain such elements as center of gravity and convenience for the user.

While the preferred embodiment of the present invention includes a deployable changing table 20 as seen in FIG. 1, it is conceived that the changing table does not need to include a back guard 35 as we see in FIG. 1. The back guard 35 of FIG. 1 is secured via conventional means to the back of a baby carriage 10. The back guard 35 typically would be constructed in the same relatively lightweight material as the changing table 20. The purpose of the back guard 35 would be to serve as a housing for the changing table 20 when the changing table 20 is closed. A function of the back guard 35 would be to stabilize the retracted changing table 20 during movement of the baby carriage 10 and also to offer the changing table 20 additional protection during such conditions as loading a baby carriage 10 into a vehicle or airplane storage unit. The back guard 35 also acts as a buffer between the actual material of the baby carriage 10 and the changing table 20. However, the changing table 20 of the present invention certainly can be secured to the actual baby carriage 10 via conventional means such as screws and hinges 15 without the use of the back guard 35, which is merely an additional embodiment of the present invention. This means that the back guard 35, as an additional embodiment, is not necessary to the present invention, but merely is an added conception of the present invention.

Figure 2:
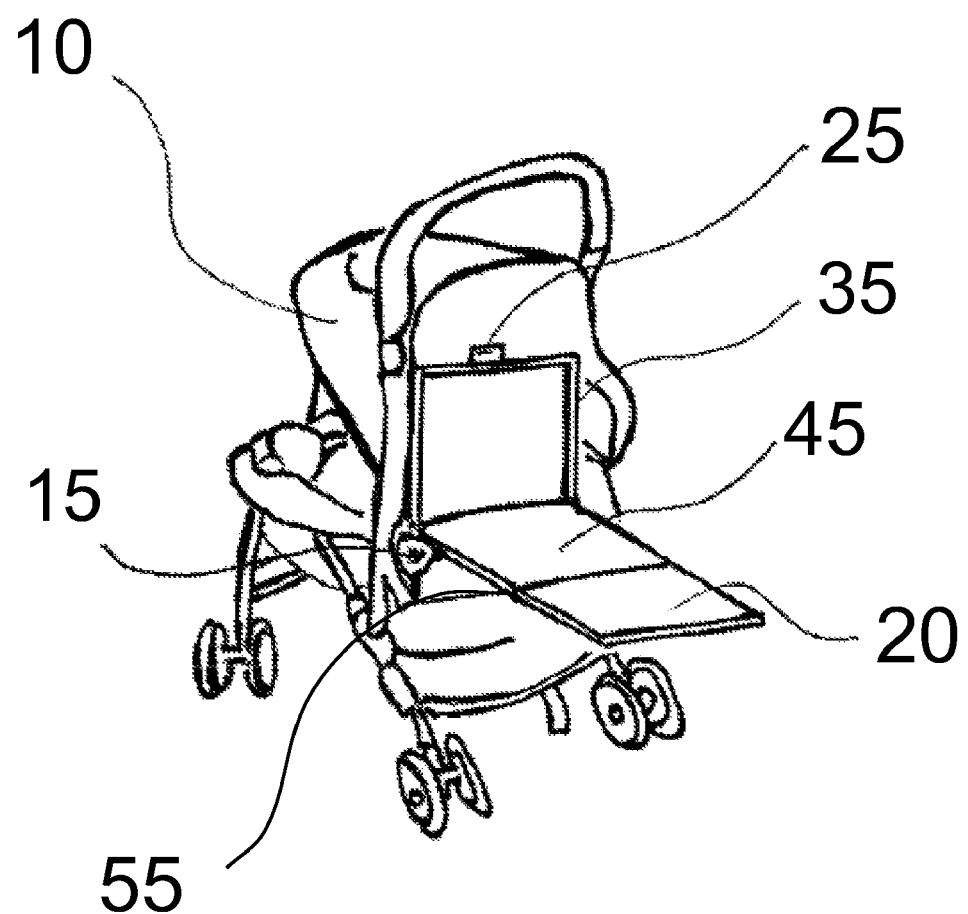
FIG. 2 is a view of the preferred embodiment of the present invention featuring a baby carriage with a fully deployed changing table.

The preferred embodiment of the present invention also includes a folded top half 45 of the changing table 20. In FIG. 1 we see an example of the folded top half 45 before it is deployed. In this embodiment, the folded top half 45 is folded inward via folded-top half hinges 55 and is flush against the back of either a closed changing table 20 or as we see in FIG. 1, the inside, surface portion of the changing table 20. When the initial changing table 20 is deployed, the folded top half 45 may also be deployed as the user pulls the folded top half 45 from underneath the deployed changing table 20 or conversely, pulls the folded top half up from the top and down as seen in FIG. 1 and FIG. 2. In essence, this embodiment serves to provide a longer changing table 20 consistent with the needs of the diaper changing process. The ability to deploy the folded top half may be commenced via tightly-connected folding top-half hinges 55 that require a bit of physical force to open and close, or a clasp 25 element similar to the one that keeps the changing table 20 flush against the baby carriage 10 as seen in FIG. 3. We see in FIG. 2 an example of the folded top half 45 that is deployed. While the present invention can serve the diaper-changing purpose for certain small children, FIG. 2 gives us a view of the practical nature of the folded top half 45 as it effectively doubles the length of the changing table.

As mentioned above, FIG. 3 shows a clasp 25 as it may be considered an embodiment of the present invention pertaining to the conventional locking mechanism relating to the changing table 20. In the embodiment featured in FIG. 3, a clasp 25 can be twisted to essentially hold the changing table 20 in place as it is folded into the back of the baby carriage 10. When the clasp 25 is twisted out of the way of the changing table 20, the user may then deploy the changing table 20.

In FIG. 3, we see that the clasp 25 is twisted to a point where the changing table 20 is obstructed. In the embodiment depicted in FIG. 3, we see that a small block 27 serves to essentially lock the clasp 25 into one spot. When a user turns the clasp 25, in the case of FIG. 3 counterclockwise, the changing table 20 is no longer obstructed.

Figure 4:
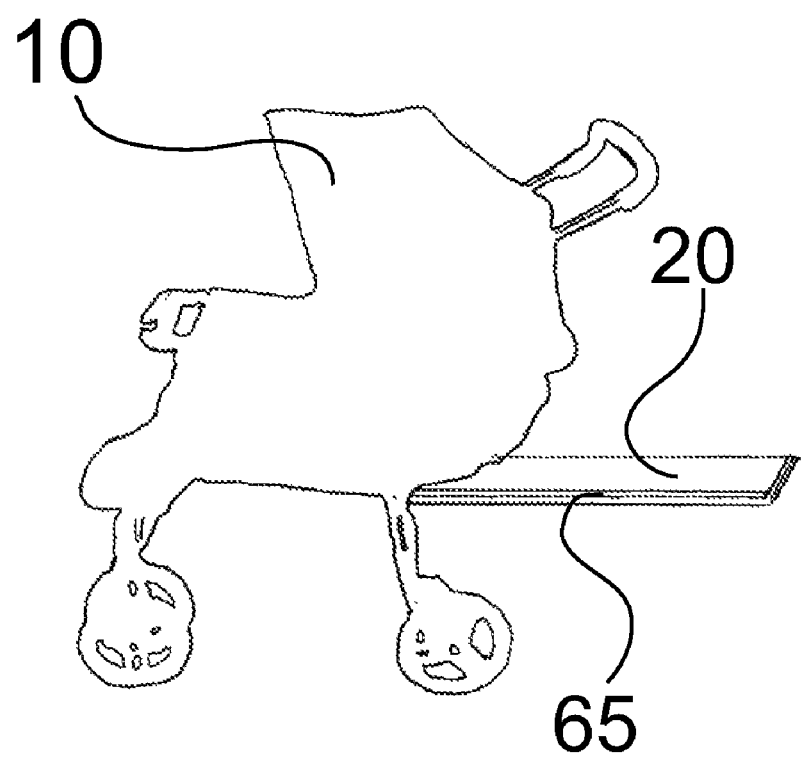
FIG. 4 is a view of an additional embodiment of the present invention relating to a baby carriage with a changing table that deploys from the bottom of the baby carriage.

The following figures are additional embodiment of the present invention in terms of connection between the baby carriage 10 and changing table 20, as well as various conceived embodiments of the deployability of the changing table 20. FIG. 4 is an additional embodiment of the present invention where we see a baby carriage 10 and a changing table 20 that is attached to the baby carriage 10. In this additional embodiment, the changing table 10 can be seen to be protruding from beneath the baby carriage 10. This is one conceivable embodiment of how the changing table 20 may be attached to the baby carriage 10. Essentially, instead of the deployment of the changing table 20 as seen in FIG. 2, the changing table 20 of FIG. 4 can be configured via conventional means to be secured to the bottom of the baby carriage 10 and merely pulled out for use and pushed back in to stow. For example, FIG. 4 depicts a conventional roller 65 that is placed along the sides of the changing table 20 and its corresponding parts of the baby carriage 10 to assist in the sliding function of this embodiment. Additional embodiments relating to the sliding aspect may include angled supports to maintain a stowed changing table 20 at a set position under the seat of the baby carriage 10 in order for a gap in space to be available to compensate for the weight of the child.

Figure 5:
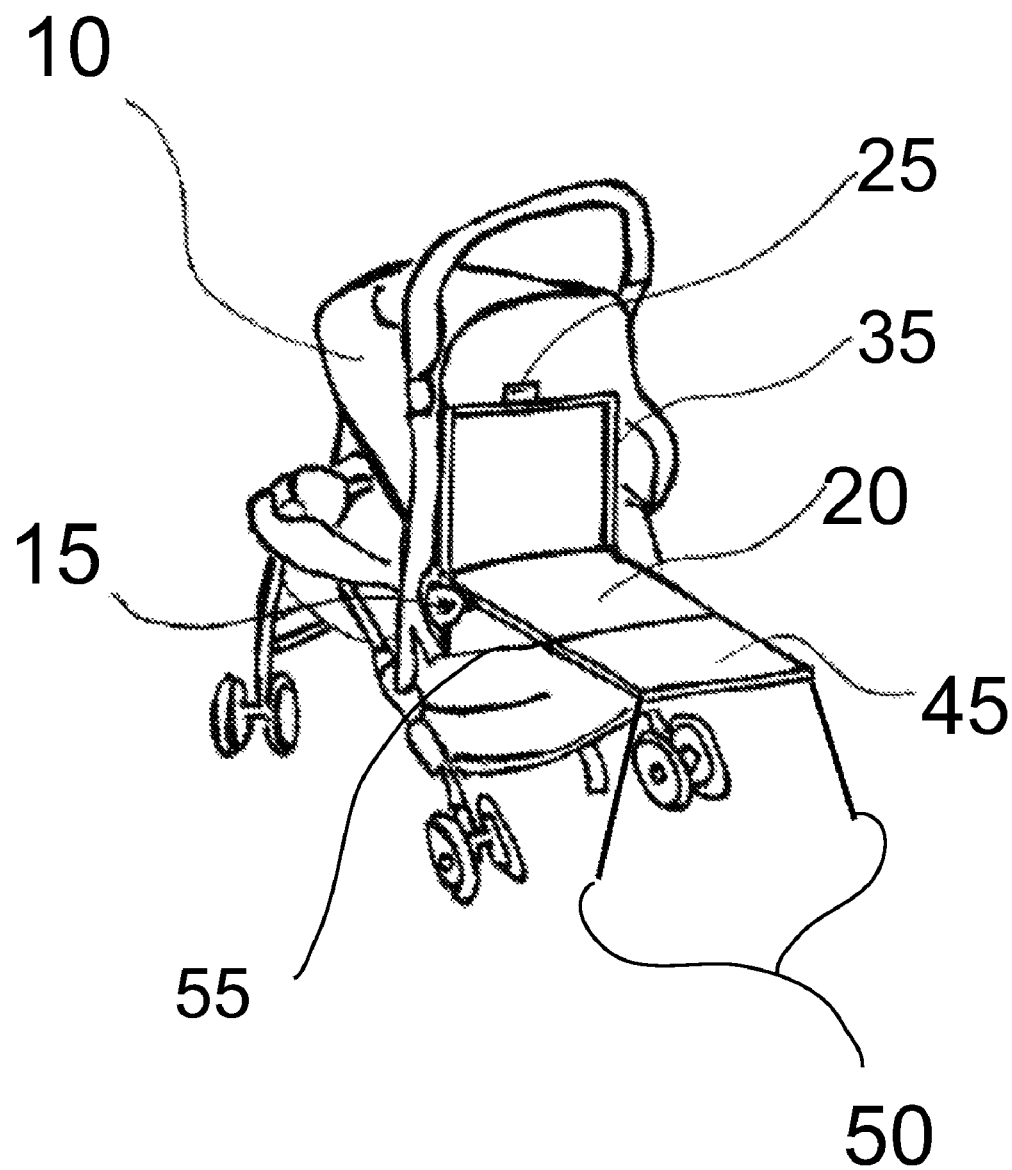
FIG. 5 is a view of an additional embodiment of the present invention relating to a baby carriage showing a changing table supported by legs.

FIG. 5 shows a view of the changing table 20 with the additional embodiment that employs retractable legs 50. The retractable legs 50 would be secured to the changing table 20 via conventional means during storage, and would be capable of deploying in order to provide sturdy balance for a deployed changing table 20.

There are of course many other conceived embodiments relating to a changing table 20 in conjunction with the back of the baby carriage 10. For example, a motor is conceived where the changing table 20 would deploy and retract without the need for typical power generated directly by the user. Many of these different embodiments are dependent upon the shape of the baby carriage 10. The importance of ease-of-use and facilitation is of course paramount. It is contemplated that different methods will be made available for different baby carriages 10.

Having illustrated the present invention, it should be understood that various adjustments and versions might be implemented without venturing away from the essence of the present invention. The present invention is not limited to the embodiments described above, and should be interpreted as any and all embodiments within the scope of the following claims.

I claim:

1. A changing table, comprising:
   a changing table apparatus secured to a back of a baby carriage with at least one hinge;
   a folded top half of said changing table apparatus configured to unfold away from said back of said baby carriage; and
   a seat secured to the front of said baby carriage that is configured to remain in place when said folded top half of said changing table apparatus is deployed.

2. The changing table of claim 1, wherein said changing table apparatus is configured to be folded flush against the back of said baby carriage while retracted and not in use.

3. The changing table of claim 1, wherein said changing table apparatus is configured to be deployed away from the back of said baby carriage.

4. The changing table apparatus of claim 3, wherein said changing table apparatus is configured to be deployed away from back of said baby carriage until said changing table apparatus is oriented into a horizontal position.

5. The changing table of claim 1, wherein said changing table apparatus is configured to be deployed and retracted via said at least one hinge.

6. The changing table of claim 5, wherein said hinge is configured to be secured to said baby carriage via conventional means.

7. The changing table of claim 5, wherein said hinge is configured to pivot as said changing table apparatus is retracted and deployed.

8. The changing table of claim 1, wherein said hinge is configured to be secured to said changing table apparatus via conventional means.

9. The changing table of claim 1, wherein said folded top half of changing table apparatus is configured to be secured to said changing table apparatus via conventional means.

10. The changing table of claim 9, wherein said folded top half of changing table apparatus is configured to be folded flush against said changing table apparatus while retracted and not in use.

11. The changing table of claim 10, wherein said folded top half of changing table apparatus is configured to be deployed away from said changing table apparatus.

12. The changing table of claim 11, wherein said folded top half of changing table apparatus is configured to be deployed away from said changing table apparatus until said folded top half of changing table apparatus is oriented into a horizontal position.

13. The changing table of claim 12, wherein said folded top half of changing table apparatus is configured to become an extension of said changing table apparatus when said folded top half of changing table apparatus is deployed.

14. The changing table of claim 9, wherein said folded top half of changing table apparatus is configured to be deployed and retracted via the use of at least one folded top-half hinge.

15. The changing table of claim 1, wherein said changing table apparatus, said folded top half of changing table apparatus, said hinge, and said folded top-half hinge are sturdy and configured to be capable of holding the weight and movement of a child during the diaper-changing process.

16. The changing table of claim 1, further comprising a locking mechanism.

17. The changing table of claim 16, wherein said locking mechanism is configured to obstruct said changing table apparatus from deploying away from a retracted position via conventional means.

18. The changing table of claim 1, further comprising a back guard that is configured to be secured via conventional means to the back of said baby carriage and also secured via conventional means to the front of said changing table apparatus.

19. A changing table, comprising:
   a changing table apparatus secured to a back of a baby carriage with at least one hinge;
   a folded top half of said changing table apparatus configured to unfold away from said back of said baby carriage; and
   a seat secured to the front of said baby carriage via conventional means that is configured to remain in place when said folded top half of said changing table apparatus is deployed;
   wherein said changing table apparatus is configured to be folded flush against the back of said baby carriage while retracted and not in use;
   wherein said changing table apparatus is configured to be deployed away from the back of said baby carriage;
   wherein said changing table apparatus is configured to be deployed away from back of said baby carriage until said changing table apparatus is oriented into a horizontal position;
   wherein said changing table apparatus is configured to be deployed and retracted via said at least one hinge;
   wherein said hinge is configured to be secured to said changing table apparatus via conventional means;
   wherein said hinge is configured to be secured to said baby carriage via conventional means;
   wherein said hinge is configured to pivot as said changing table apparatus is retracted and deployed;
   wherein said folded top half of changing table apparatus is configured to be secured to said changing table apparatus via conventional means;
   wherein said folded top half of changing table apparatus is configured to be folded flush against said changing table apparatus while retracted and not in use;
   wherein said folded top half of changing table apparatus is configured to be deployed away from said changing table apparatus;
   wherein said folded top half of changing table apparatus is configured to be deployed away from said changing table apparatus until said folded top half of changing table apparatus is oriented into a horizontal position;
   further comprising a locking mechanism; and
   wherein said locking mechanism is configured to obstruct said changing table apparatus from deploying away from a retracted position via conventional means.

* * * * *